United States Patent
Woodworth et al.

(10) Patent No.: US 12,445,434 B2
(45) Date of Patent: Oct. 14, 2025

(54) SYSTEMS AND METHODS TO IMPROVE NETWORK SECURITY VIA CONSENSUS-DRIVEN CONFIGURATION PLANE

(71) Applicant: CenturyLink Intellectual Property LLC, Denver, CO (US)

(72) Inventors: John R.B. Woodworth, Amissville, VA (US); Dean Ballew, Sterling, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 83 days.

(21) Appl. No.: 18/647,847

(22) Filed: Apr. 26, 2024

(65) Prior Publication Data

US 2024/0380749 A1    Nov. 14, 2024

Related U.S. Application Data (60) Provisional application No. 63/500,873, filed on May 8, 2023.

(51) Int. Cl.
*H04L 9/40*    (2022.01)
*H04L 41/0866*    (2022.01)

(52) U.S. Cl.
CPC ........ *H04L 63/083* (2013.01); *H04L 41/0866* (2013.01); *H04L 63/20* (2013.01)

(58) Field of Classification Search
CPC .... H04L 63/083; H04L 63/20; H04L 41/0866
See application file for complete search history.

(56) References Cited

U.S. PATENT DOCUMENTS

| | | | |
|---|---|---|---|
| 7,117,195 B2* | 10/2006 | Chantrain | H04L 63/0227 707/999.001 |
| 7,898,971 B2* | 3/2011 | Qian | H04L 41/0866 370/242 |
| 11,755,928 B1* | 9/2023 | Blackburn | H04L 41/0866 706/47 |
| 2012/0311116 A1* | 12/2012 | Jalan | H04L 41/084 709/222 |
| 2013/0036161 A1* | 2/2013 | Chen | H04W 4/50 709/203 |
| 2015/0295931 A1* | 10/2015 | Russell | H04L 41/0866 726/4 |
| 2023/0179483 A1* | 6/2023 | Bedouet | H04L 41/0866 709/220 |
| 2024/0320048 A1* | 9/2024 | Tao | H04L 41/0846 |
| 2024/0340646 A1* | 10/2024 | Brown | H04L 67/1097 |

FOREIGN PATENT DOCUMENTS

| | | | | |
|---|---|---|---|---|
| CN | 105071965 B | * | 7/2018 | |
| CN | 110912743 A | * | 3/2020 | H04L 41/0866 |
| CN | 114978985 A | * | 8/2022 | H04L 45/16 |

* cited by examiner

*Primary Examiner* — Richard G Keehn (57) ABSTRACT

Configuration changes to the configurations of end devices in a network may be made by configuration devices, which may set up connections with the end devices and send configuration commands to the end devices. In such a system, the compromising of a configuration device may make it possible for an attacker to reconfigure end devices. Systems and methods to improve network security via a consensus-driven configuration plane are provided.

20 Claims, 6 Drawing Sheets

FIG. 3

SYSTEMS AND METHODS TO IMPROVE NETWORK SECURITY VIA CONSENSUS-DRIVEN CONFIGURATION PLANE

CROSS-REFERENCE TO RELATED APPLICATIONS

This application claims the benefit of U.S. Provisional Application No. 63/500,873 filed May 8, 2023, entitled "Systems and Methods to Improve Network Security Via Consensus-Driven Configuration Plane," which is incorporated herein by reference in its entirety.

FIELD

One or more aspects of embodiments according to the present disclosure relate to networks, and more particularly to systems and methods to improve network security via a consensus-driven configuration plane.

BACKGROUND

Configuration changes, to the configurations of end devices in a network, may be made by configuration devices, which may send configuration commands to the end devices. In such a system, the compromising of a configuration device may make it possible for an attacker to reconfigure end devices, which can affect both the security and the operation of the network.

It is with respect to this general technical environment that aspects of the present disclosure are related.

SUMMARY

Systems and methods to improve network security via a consensus-driven configuration plane are provided. In an aspect, a system includes a proxy, comprising memory and at least one processing circuit. The proxy may be configured to receive a first configuration command, for an end device, from a first configuration device; receive a second configuration command, for the end device, from a second configuration device; determine that the first configuration command matches the second configuration command; and in response to determining that the first configuration command matches the second configuration command, send the first configuration command to the end device.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of systems and methods to improve network security via a consensus-driven configuration plane provided in accordance with the present disclosure and is not intended to represent the only forms in which the present disclosure may be constructed or utilized. The description sets forth the features of the present disclosure in connection with the illustrated examples. It is to be understood, however, that the same or equivalent functions and structures may be accomplished by different examples that are also intended to be encompassed within the scope of the disclosure. As denoted elsewhere herein, like element numbers are intended to indicate like elements or features.

Figure 1:
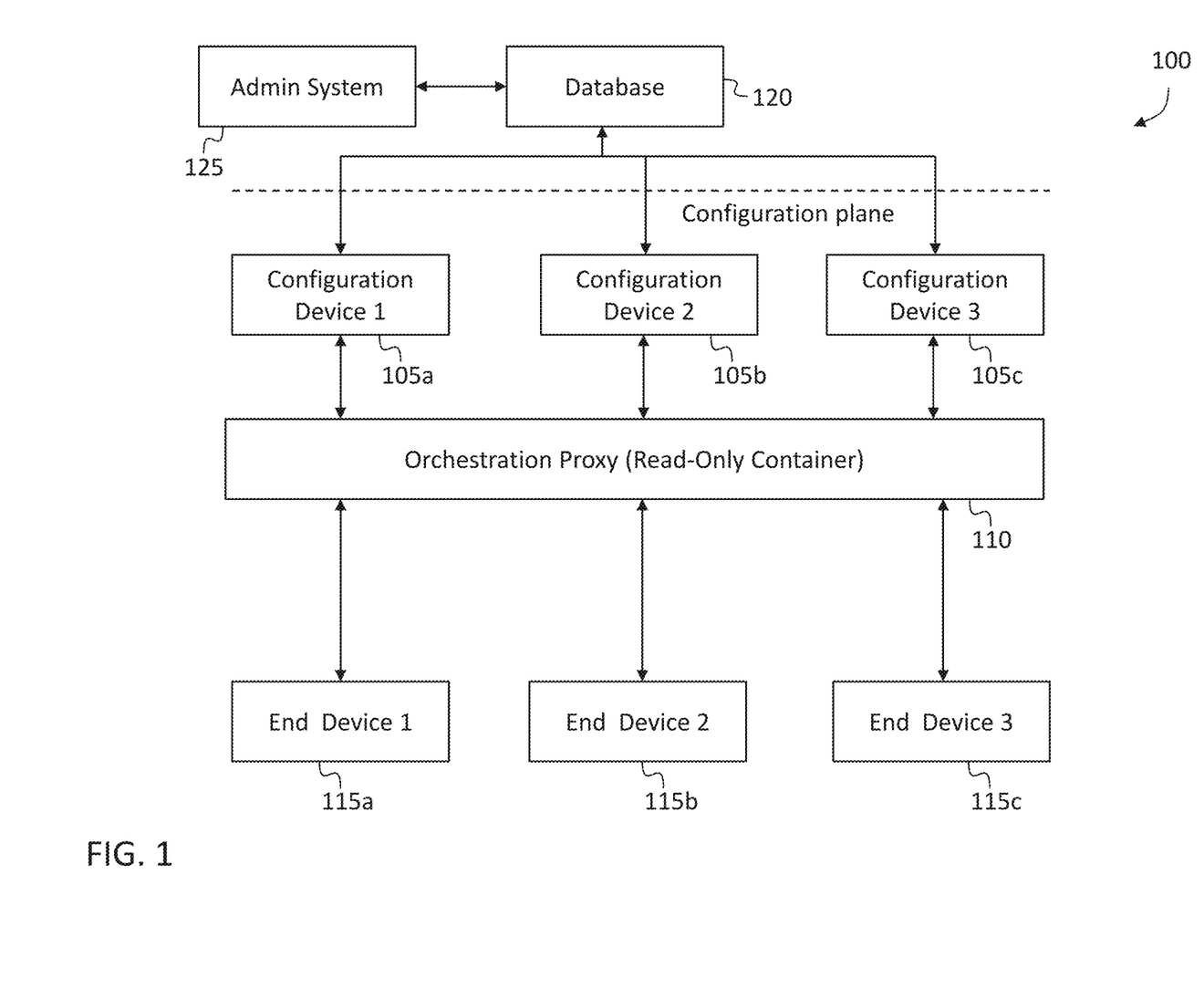
FIG. 1 is a block diagram of a portion of a network, according to an example of the present disclosure.

Referring to FIG. 1, in some examples, a network 100 includes a plurality of configuration devices 105 (e.g., a first configuration device 105a, a second configuration device 105b, and a third configuration device 105c), a proxy (e.g., an orchestration proxy 110), and one or more end devices 115 (e.g., a first end device 115a, a second end device 115b, and a third end device 115c). In operation, when a configuration change is to be made to an end device 115, a suitable configuration command for effecting the configuration change may be generated by one or more of the configuration devices and sent to the end device 115, which may execute the configuration command, resulting in a change in its configuration. Each of the devices of FIG. 1 (e.g., configuration device 105, orchestration proxy 110, end device 115, database 120, admin system 125) may be a network device. As used herein, a "network device" is a device that, when connected to the network, is capable of communicating over the network. In non-exclusive examples, end devices 115 may include routing devices, gateway devices, line cards, modems, or other devices that facilitate the operation of a network. In non-exclusive examples, configuration changes may comprise the addition or deletion of applications or functions on the end devices 115, modifications to configurations parameters for the hardware, firmware, or software of the end devices 115, including routing table entries, firewall settings, or other parameters.

The ability to send configuration commands to end devices may be valuable to malicious actors seeking to compromise the network because, for example, a change to the configuration of an end device 115 (caused by the malicious actor) may disable security features of the end device 115, allowing the malicious actor to execute further attacks through the end device 115. As such, a malicious actor may seek to compromise one of the configuration devices 105, to gain the ability to cause configuration changes in the end devices 115.

As an obstacle to such an attack, a plurality of configuration devices 105 may be configured to operate in parallel, so that when a configuration change is needed, each of the configuration devices 105 will transmit a respective configuration command to effect the configuration change. The configuration commands may be routed through the orchestration proxy 110, which may be configured to receive a respective configuration command from each of the configuration devices 105 and to send a configuration command to the end device 115 for which it is intended only if a consensus criterion, based on the configuration commands received from the configuration devices 105, is met (e.g., if all or a majority of the configuration commands are identical). A discrepancy between, e.g., two of the configuration commands may be an indication that one of the configuration devices 105 has malfunctioned (e.g., has been compromised).

To avoid the sending of configuration commands directly from any of the configuration devices 105 to an end device 115, each end device may be connected to each configuration device 105 only through one or more network switching devices (e.g., switches or routers) (i.e., the end device may not be connected directly, without an intervening network switching device) to any configuration device 105), and each of the network switching devices to which an end device 115 is connected may be configured to forward packets (e.g., Ethernet frames) (e.g., packets carrying a configuration command) to the end device 115 only if they were sent by the orchestration proxy 110. This may be accomplished as follows. For example, the orchestration proxy 110 may be advertising the Internet Protocol (IP) addresses of the end devices 115 so that all of intervening routers send traffic for those IP addresses to the orchestration proxy 110. This behavior may be built into the routing table of the router that is closest to each configuration device 105. The orchestration proxy 110 may intercept all the messages to the end devices 115, so only the messages sent by the orchestration proxy 110 would be received by the end devices 115. As another example, the orchestration proxy may be the routing device for the local area network (LAN) (wired or wireless) in a data center that includes all of the configuration devices 105. For example, the orchestration proxy 110 may be a machine that operates as a routing device, and the configuration devices 105 may be connected via the LAN to the device hosting the orchestration proxy 110 so that all messages to and from the configuration devices 105 are routed to the orchestration proxy 110. For example, in some examples, the 105 configuration devices are 'wired' to the orchestration proxy 110, hence making the packet flow more efficient, and more trusted. Moreover, each of the configuration devices 105 may require credentials for access, and the credentials for the different configuration devices 105 may be different, so that a malicious actor who has obtained unauthorized access to credentials for one of the configuration devices 105 will not as a result have access to all of the configuration devices 105. In some examples three configuration devices 105 participate (as illustrated in FIG. 1). In some examples only two configuration devices 105 participate, and in some examples, more than three configuration devices 105 participate.

The consensus criterion among the configuration devices 105 may be selected (by suitable configuration of the orchestration proxy 110) to require a high degree of consensus (e.g., unanimous agreement among the configuration devices 105) or a relatively low degree of consensus (e.g., agreement between two (i.e., at least two) of the configuration devices 105) (where "agreement" between any two of the configuration devices 105 means that the two devices sent respective configuration commands that match). As used herein, a first configuration command and a second configuration command may be said to "match" when the configuration change the first configuration command would cause in the end device is the same as the configuration change the second configuration command would cause in the end device 115. In an example in which only two configuration devices 105 participate, the consensus criterion may be unanimous consensus, i.e., the orchestration proxy 110 may send a configuration command only when the configuration commands sent by all of the configuration devices 105 match. In other examples, a majority of matching configuration commands is required for consensus (e.g., 2 out of 3), or a maximum of one, non-matching configuration command is permitted for the consensus criterion to be met (e.g., 4 out of 5).

If the consensus criterion is met, the orchestration proxy 110 may send the configuration command to the end device 115 for which it is intended. It may also wait for any response from the end device 115, and forward the response to each of the configuration devices 105 (or to each of the configuration devices 105 that had sent a configuration command matching the configuration command that met the consensus criterion).

If the consensus criterion is met without unanimous consensus having been reached, the orchestration proxy 110 may take any of various action with respect to the one or more "dissenting" configuration devices 105 (configuration devices 105 that had sent commands not matching the configuration command that met the consensus criterion), e.g., based on the inference that any dissenting configuration device is malfunctioning and may have been compromised. For example, the orchestration proxy 110 may send, to a dissenting configuration device 105, a synthesized response that the end device 115 would have generated had it executed the configuration command sent by the dissenting configuration device 105. Such an action may delay the realization by a malicious actor that an attack on the end device 115 has not succeeded, possibly making more likely the apprehension of the malicious actor or preventing the malicious actor from reacting by attacking other configuration devices 105. The orchestration proxy 110 may also send an alert, e.g., to a system administrator, notifying the recipient of the possibility that one of the configuration devices 105 (the dissenting configuration device 105) has been compromised.

To reduce the risk of a successful attack on the orchestration proxy 110, the orchestration proxy 110 may be configured to run in a read-only container. For example, it may be constructed with a processing circuit (e.g., a central processing unit (CPU)) configured to fetch instructions (a proxy application) only from memory at addresses falling within certain ranges, and the orchestration proxy 110 may be constructed to have read-only memory at each of the addresses within these ranges. The read-only memory may be memory the contents of which cannot be modified by the CPU. For example, the contents of the read-only memory may be changed only by removing the read-only memory and replacing it with differently programmed read-only memory, or the contents may be changed only through write commands sent through a separate hardware path implemented for that purpose (e.g., by a separate computer connected temporarily to a connector on the separate hardware path), or the hardware may be configured to allow the CPU to modify the read-only memory only when a secure override (e.g., a push-button switch, on the motherboard of the orchestration proxy 110) is activated (e.g., by an operator at the location of the orchestration proxy 110). For example, the orchestration proxy 110 may include an Intel™ Itanium™ processor, which may be suitable for secure applications, e.g., Domain Name System Security Extensions (DNSSEC) signer implementations. The system may include a security element, to reduce the risk of poisoning, which, if it occurs, may negate the entire integrity of the design. Having the configurations cached or stored in read-only memory (ROM) may add such a security element, and grant integrity to the data. As such, in some examples, the read-only container is the security element, which delivers integrity to the data.

Each of the end devices 115 may require that it receive a valid password from the sender of any configuration command before it executes the configuration command. In some examples, the orchestration proxy 110 receives such a password from each of the configuration devices 105 with the configuration commands, and it forwards one of the received passwords to the end device 115 when it sends the configuration command to the end device 115. In some examples, none of the configuration devices 105 is in possession of the entire password; instead, each of the configuration devices 105 is in possession of a respective partial password. As used herein, a "partial password" is a word (e.g., a string of characters or bits) that is not a valid password, and that may be combined (e.g., by concatenation, or by other operations such as exclusive OR) with other partial passwords to generate a valid password. The partial passwords may be selected such that if a sufficient number of configuration devices 105 to meet the consensus criterion send the same configuration command, then these configuration devices 105 together are in possession of partial passwords that may be combined by the orchestration proxy 110 to generate a valid password for the end device 115. The partial passwords may be generated from a valid password in a manner analogous to the saving of data on multiple storage devices in a redundant array of independent disks (RAID)-5 system. In an example with N configuration devices 105, N−1 of the configuration devices 105 may each be in possession of a portion of the password, the N−1 portions when combined (e.g., concatenated) being sufficient to construct the password. The remaining configuration device 105 may be in possession of parity data that may be used, together with all but a missing one of the N−1 portions, to reconstruct the missing portion. In another example, the password may be divided into N portions, and each of the configuration devices 105 may be in possession of two of the N portions, with none of the configuration devices 105 having the same two portions as any other one of the configuration devices 105.

The orchestration proxy 110 may be transparent from the perspective of the configuration devices 105 and from the perspective of the end devices 115, in the sense that its presence may not be apparent, from the communications received from the orchestration proxy 110, to the configuration devices 105 nor to the end devices 115. As such, the orchestration proxy 110 may, in its communications with a configuration device 105, emulate an end device 115, and in its communications with an end device 115, the orchestration proxy 110 may emulate a configuration device 105. For example, the sending of a configuration command may, in the absence of an orchestration proxy 110, involve setting up a connection (e.g., a secure shell (ssh) connection) between the configuration device 105 and the end device 115. In such an example, the orchestration proxy 110 may first set up a secure shell connection with each of the configuration devices 105, and, if the consensus criterion is met, it may set up a secure shell connection with the end device 115 and send, to the end device 115, the configuration command for which the consensus criterion was met. It may then send the configuration command to the end device 115, and, if it receives a response from the end device 115, it may send the response to each of the configuration devices 105 (through the previously established secure shell connections).

In some circumstances, however, delays may be an obstacle to the execution of a sequence as described above. For example, if the configuration command is in the form of a large file, then a significant amount of time may elapse before the orchestration proxy 110 receives the file from each of the configuration devices 105 and performs comparisons to determine whether the consensus criterion has been met. As another example, the configuration devices 105 may be geographically separated from each other and from the orchestration proxy 110, so that communication latencies may result in delays. In such a situation, if one of the configuration devices 105 sends a configuration command and does not receive a prompt response, it may assume the transmission failed, shut down the connection and attempt to establish a new connection. Moreover, if the presence of the orchestration proxy 110 results in significant delays it may not operate as a transparent proxy, and, for example, it may be possible for a malicious actor in control of one of the configuration devices 105 to then infer the presence of the orchestration proxy 110.

As such, in some examples, the orchestration proxy 110 may generate, and send to each of the configuration devices 105, an anticipated command response upon receiving a configuration command from the configuration device 105. The anticipated command response may be generated, for example, using a table or library of command responses. For example, if a configuration device 105 sends a configuration command instructing an end device 115 to restart, the orchestration proxy 110 may determine, from the library, that the expected response to such a command is the string "Shutting down . . . " and the orchestration proxy 110 may send this string, to the configuration device 105, as an anticipated command response. In some examples, the orchestration proxy 110 may send the anticipated command response upon expiration of a timer based on a time at which the command was received by the orchestration proxy 110 from the configuration device 105. In examples, the timer may be shorter than a known time-out period for the configuration device 105. If, after sending an anticipated command response, the orchestration proxy 110 receives an unexpected response (e.g., an error) from the end device 115, then the orchestration proxy 110 and the end device 115 may mitigate the error, by, e.g., having the orchestration proxy 110 or the configuration device 105 retry the command. In some examples, an elevation command may occur. Such an elevation command may check on the logs of the configuration device 105 to see further details, that may either show that everything is in order, or that may signal that an operator needs to intervene. Events of the orchestration proxy 110 or the configuration device 105 may be tied into a Network Monitoring System dashboard, for operations to watch.

In some examples, configuration commands are triggered by changes in a configuration database 120. Such changes in the configuration database 120 may be made by an administrative system 125, which may be, or include, (i) a user device connected to the network 100, operated by a system administrator, or (ii) an automated process updating one or more databases based on instructions it has received (e.g., from a system administrator). When a change is made in the database 120, the change may be pushed to the configuration devices 105 (e.g., each of the configuration devices 105 may be notified of the change) or the configuration devices 105 may become aware of such changes by each periodically polling the database 120.

Each configuration command may take any of various forms. For example, a configuration command may be a single command-line command, or a script including a sequence of command-line commands, or a script including commands and data (with, e.g., the data being arrays of configuration values, or other data structures of configuration values).

Figure 2A:
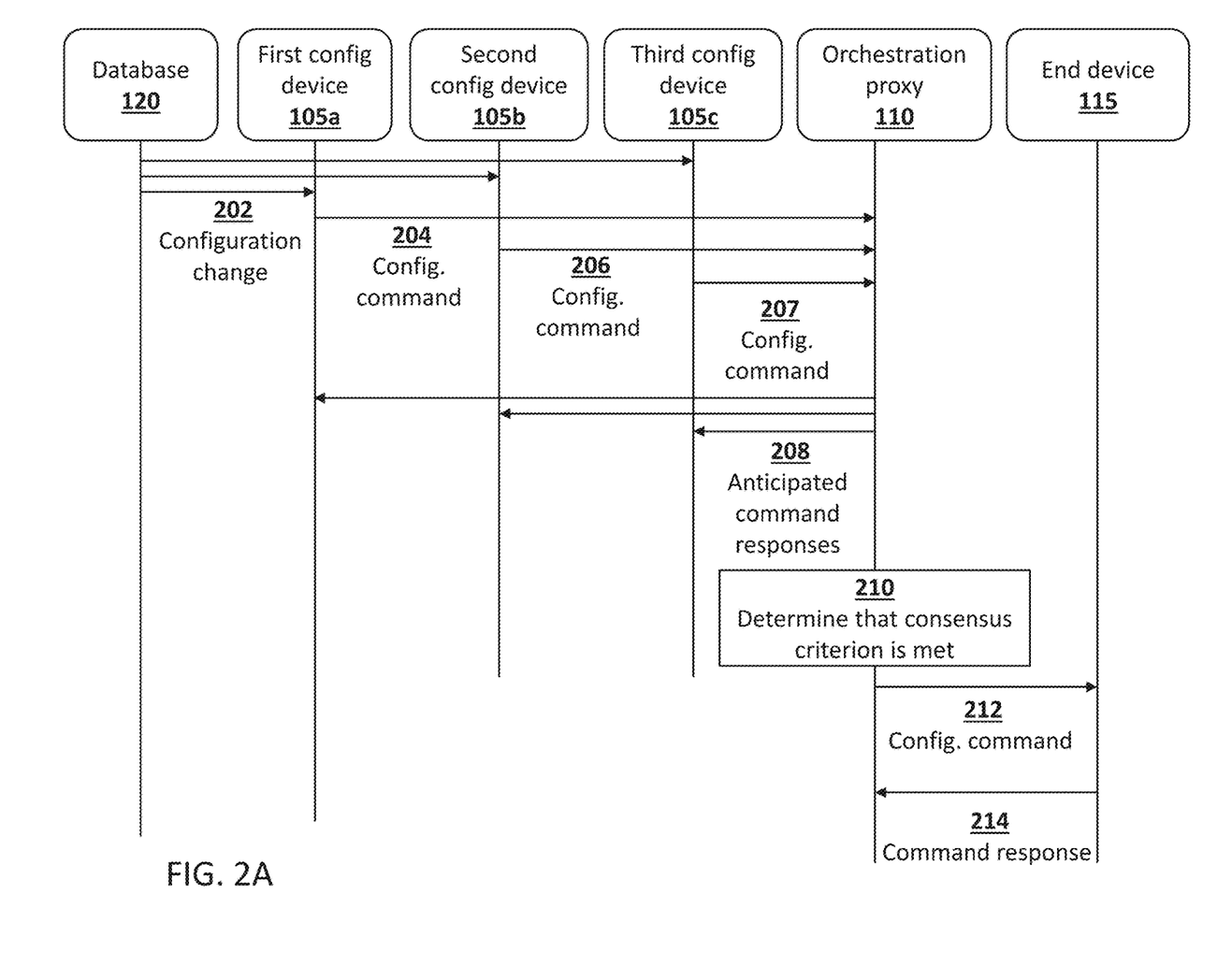
FIG. 2A illustrates a portion of a method for improving network security, according to an example of the present disclosure.

FIG. 2A depicts an example method 200 in which aspects of the present technology may be practiced by a server storing the configuration database 120, the first configuration device 105a, the second configuration device 105b, the third configuration device 105c, the orchestration proxy 110, and an end device 115. FIG. 2A shows three configuration devices 105; in some examples, four or more configuration devices 105 may participate. At 202, a configuration change is propagated from the configuration database 120 to the first configuration device 105a, to the second configuration device 105b, and the third configuration device 105c (e.g., as a result of pushing of the change by the server, or as a result of polling of the configuration database 120, by the first configuration device 105a, the second configuration device 105b, and the third configuration device 105c). At 204, the first configuration device 105a sends a corresponding configuration command to the orchestration proxy 110, at 206 the second configuration device 105b sends a corresponding configuration command to the orchestration proxy 110, and at 207, the third configuration device 105c sends a corresponding configuration command to the orchestration proxy 110. In the example of FIG. 2A, the configuration command received, by the orchestration proxy 110, from the first configuration device 105a matches the configuration command received from the second configuration device 105b, and the third configuration device 105c is a dissenting configuration device 105 (e.g., the configuration command received from the third configuration device 105c does not match either of the other two configuration commands received by the orchestration proxy 110). At 208, the orchestration proxy 110 then sends an anticipated command response to each of the first configuration device 105a and the second configuration device 105b. In some examples, a respective anticipated command response is sent to each of the configuration devices 105 (to avoid a time out in the first configuration device 105a and in the second configuration device 105b, perhaps at the end of a timer, and to emulate, to the third configuration device 105c, the behavior that would have resulted had the configuration command of the third configuration device 105c succeeded). In other examples, the anticipated command response is sent only to the dissenting device, or only to the consensus devices (the first configuration device 105a and the second configuration device 105b) or not sent unless and until the proxy fails to receive the actual command response within a time period.

At 210, the orchestration proxy 110 determines that the consensus criterion has been met. This may involve determining, for example (if the consensus criterion is met when any two of the three configuration devices 105 agree), that the configuration command received from the first configuration device 105a matches the configuration command received from the second configuration device 105b. At 212, the orchestration proxy 110, having determined that the configuration command received from the first configuration device 105a matches the configuration command received from the second configuration device 105b, sends the configuration command to the end device 115, and at 214, the end device 115 sends a command response to the orchestration proxy 110. The orchestration proxy 110 may acknowledge the receipt of the command response, or it may disregard the command response. In examples where the orchestration proxy 110 has not yet sent an anticipated command response, it may send the received command response to the configuration devices 105.

Figure 2B:
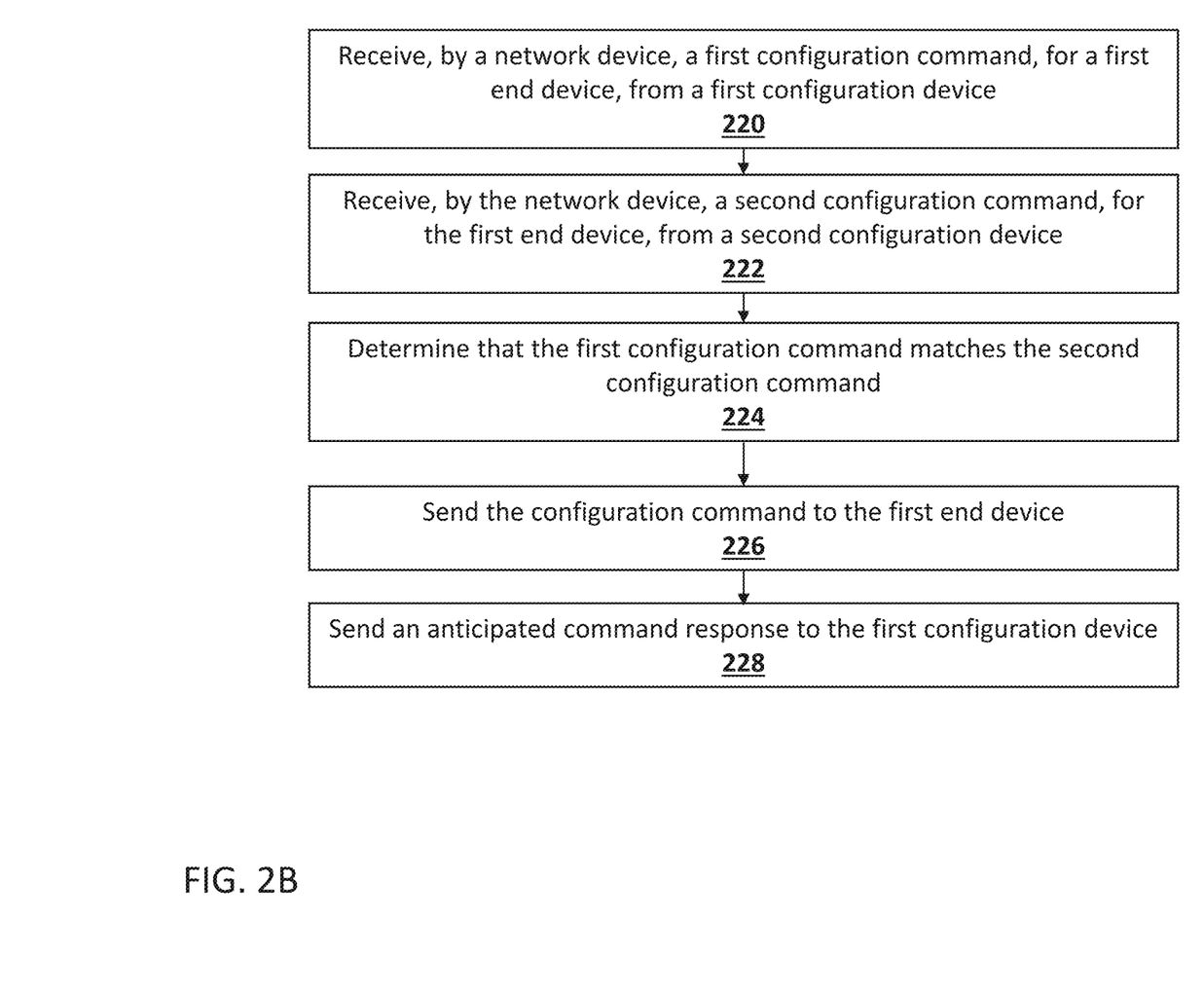
FIG. 2B illustrates a portion of a method for improving network security, according to an example of the present disclosure.

FIG. 2B is a flowchart of a method, in some examples. The method includes receiving, at 220, by a network device, a first configuration command, for an end device 115, from a first configuration device 105a. As mentioned above, the network device may be an orchestration proxy 110, and the end device 115 may be or include routing devices, gateway devices, line cards, modems, or other devices that facilitate the operation of a network. In non-exclusive examples, configuration changes may comprise the addition or deletion of applications or functions on the end device 115, modifications to configurations parameters for the hardware, firmware, or software of the end device 115, including routing table entries, firewall settings, or other parameters.

The method further includes receiving, at 222, by the network device, a second configuration command, for the end device 115, from a second configuration device 105b. The second configuration command may match the first configuration command.

The method further includes determining, at 224, that the first configuration command matches the second configuration command. This determining may be performed by the orchestration proxy 110, which may determine that the commands are identical, or that the expected effect of the commands on the end device 115, if sent to the end device 115, would be identical.

The method further includes, in response to determining that the first configuration command matches the second configuration command, sending, at 226, the first configuration command to the end device 115. In other examples, the network device (e.g., the orchestration proxy 110) may instead send the second configuration command to the end device 115, to similar effect.

The method further includes sending, at 228, by the network device, an anticipated command response to the first configuration device 105a. As mentioned above, the anticipated command response may be generated, for example, using a table or library of command responses. In some examples, the network device also sends the anticipated command response to the second configuration device 105b.

Figure 2C:
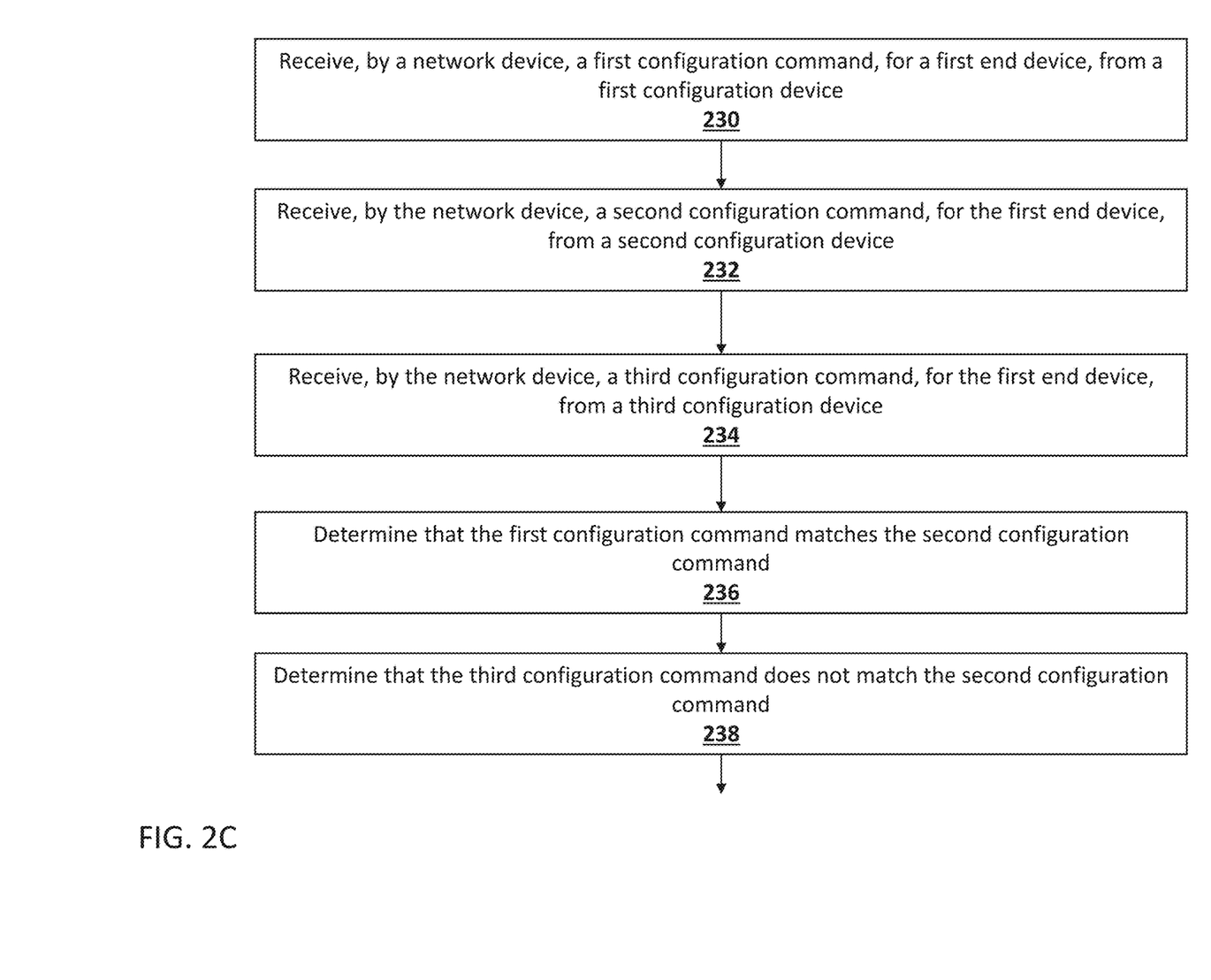
FIG. 2C illustrates a portion of a method for improving network security, according to an example of the present disclosure.
Figure 2D:
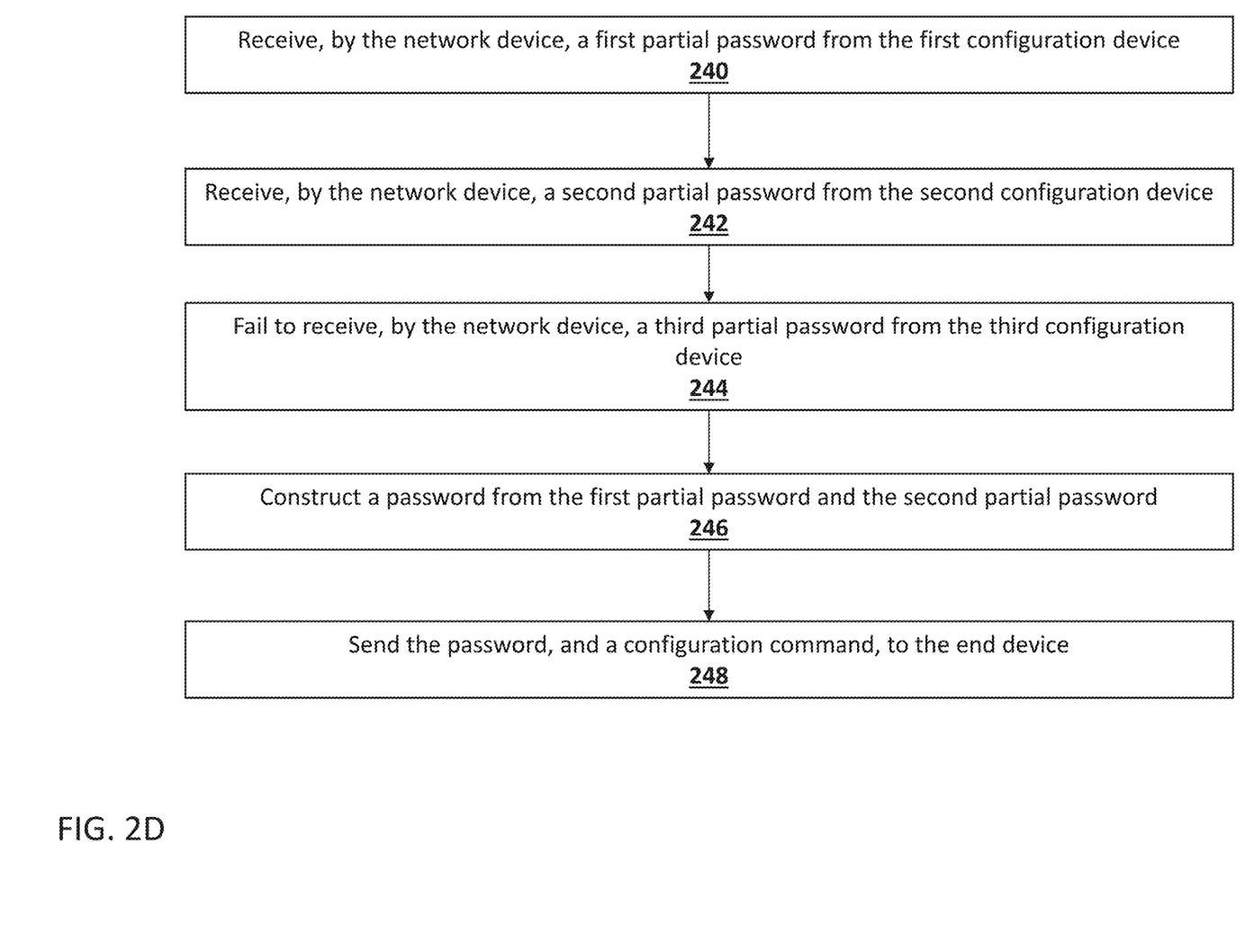
FIG. 2D illustrates a portion of a method for improving network security, according to an example of the present disclosure.

FIGS. 2C and 2D depict a flowchart of a method, in some examples (with FIG. 2C showing a first portion of the method, and FIG. 2D showing a second portion of the method). The method includes receiving, at 230, by a network device, a first configuration command, for an end device 115, from a first configuration device 105a. As mentioned above, the network device may be or include an orchestration proxy 110.

The method further includes receiving, at 232, by the network device, a second configuration command, for the end device 115, from a second configuration device 105b. The second configuration command may match the first configuration command.

The method further includes receiving, at 234, by the network device, a third configuration command, for the end device 115, from a third configuration device 105c. The third configuration command may not match the first configuration command.

The method further includes determining, at 236, that the first configuration command matches the second configuration command. This determining may be performed by the orchestration proxy 110, which may determine that the commands are identical, or that the expected effect of the commands on the end device 115, if sent to the end device 115, would be identical.

The method further includes determining, at 238, that the third configuration command does not match the first configuration command. This determining may be performed by the orchestration proxy 110, which may determine that the expected effect of the commands on the end device 115, if sent to the end device 115, would not be identical.

The method further includes receiving, at 240, by the network device, a first partial password from the first configuration device 105a. The first partial password may be a partial password that when combined with one or more other partial passwords may be used to generate a password for the end device 115.

The method further includes receiving, at 242, by the network device, a second partial password from the second configuration device 105b. Like the first partial password, the second partial password may be a partial password that when combined with one or more other partial passwords may be used to generate a password for the end device 115.

The method further includes failing to receive, at 244, by the network device, a third partial password from the third configuration device. Like the first partial password, the third partial password may be a partial password that when combined with one or more other partial passwords may be used to generate a password for the end device 115.

The method further includes constructing, at 246, a password from the first partial password and the second partial password, without the use of the third partial password. The constructing may include concatenating a portion of the first partial password with a portion of the second partial password, or using the second partial password as parity data to regenerate, from the first partial password and the second partial password, the third partial password, which may then be concatenated with the first partial password.

The method further includes, in response to determining that the first configuration command matches the second configuration command, sending, at 248, the first configuration command and the password to the end device 115. In other examples, the network device (e.g., the orchestration proxy 110) may instead send the second configuration command to the end device 115, to similar effect.

Figure 3:
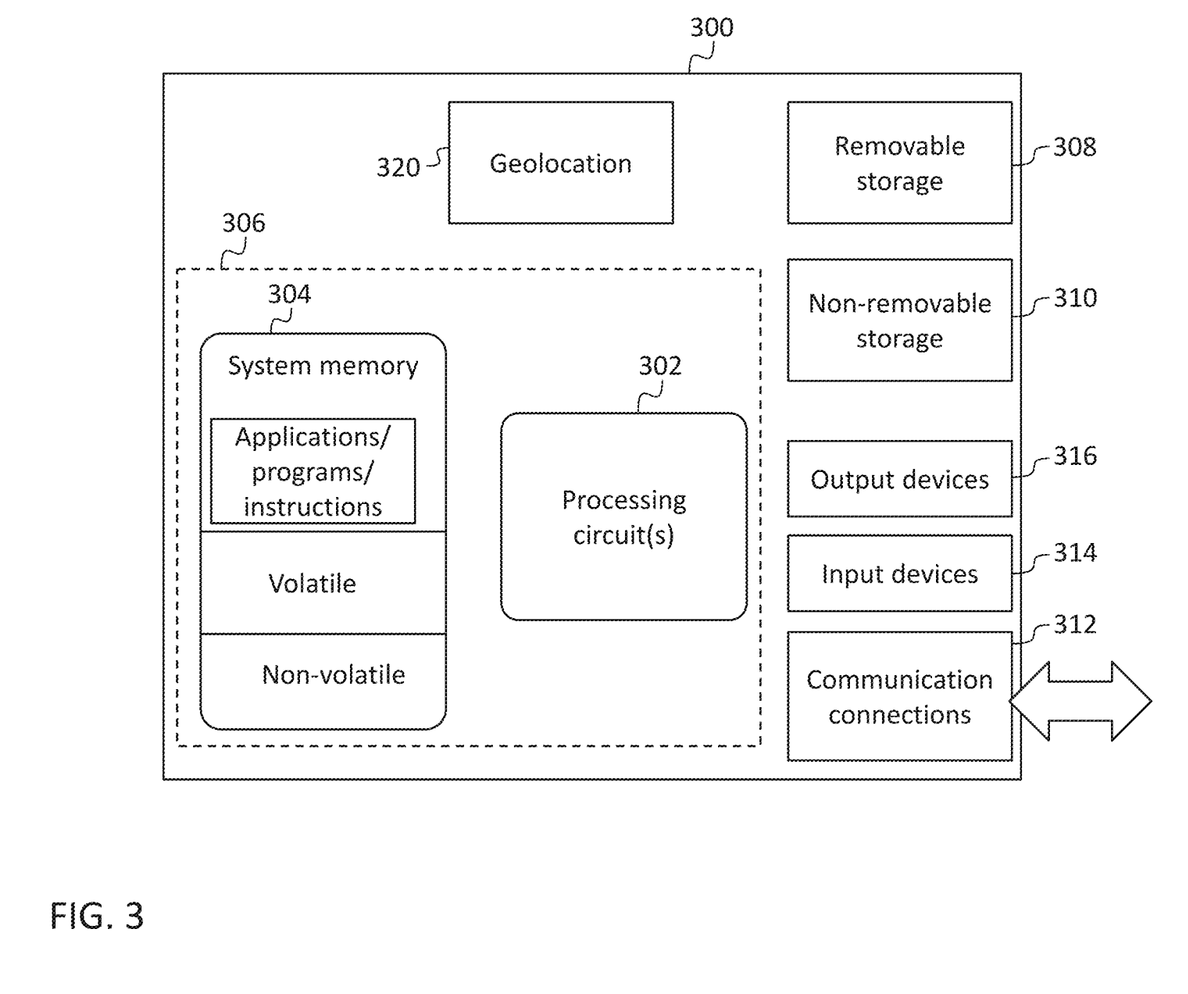
FIG. 3 is a block diagram of an operating environment, according to an example of the present disclosure.

FIG. 3 depicts an example of a suitable operating environment 300, portions of which may be used to implement the administrative system 125, a server storing the configuration database 120, any of the configuration devices 105, the orchestration proxy 110, any of the end devices 115, or other devices that may include computing functionality within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein. Further, environment 300 may also include storage (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although exemplary embodiments of systems and methods to improve network security via a consensus-driven configuration plane have been specifically described and illustrated herein, many modifications and variations will be apparent to those skilled in the art. Accordingly, it is to be understood that systems and methods to improve network security via a consensus-driven configuration plane constructed according to principles of this disclosure may be embodied other than as specifically described herein. The invention is also defined in the following claims, and equivalents thereof.

What is claimed is:

1. A system, comprising:
  a proxy, comprising memory and at least one processing circuit,
  the proxy being configured to:

receive a first configuration command, for an end device, from a first configuration device;

receive a second configuration command, for the end device, from a second configuration device;

determine that the first configuration command matches the second configuration command; and in response to determining that the first configuration command matches the second configuration command, send the first configuration command to the end device.

2. The system of claim 1, wherein the proxy is further configured to receive, before the determining, a third configuration command, for the end device, from a third configuration device, the third configuration command not matching the first configuration command.

3. The system of claim 1, wherein:

the proxy is configured to receive a plurality of respective configuration commands, including the first configuration command and the second configuration command, for the end device, from a plurality of configuration devices including the first configuration device and the second configuration device;

the proxy is configured to determine whether a consensus criterion is met; and the sending of the first configuration command to the end device is in response to determining that the consensus criterion is met.

4. The system of claim 3, wherein the consensus criterion is met when a plurality of the configuration commands match.

5. The system of claim 3 wherein the consensus criterion is met when a majority of the configuration commands match.

6. The system of claim 3, wherein the plurality of configuration devices consists of three configuration devices.

7. The system of claim 6, wherein the consensus criterion is met when two of the configuration commands match.

8. The system of claim 7, wherein the consensus criterion is met when all of the configuration commands match.

9. The system of claim 3, wherein the consensus criterion is met when all but one of the configuration commands match.

10. The system of claim 3, wherein the consensus criterion is met when all of the configuration commands match.

11. The system of claim 1, wherein the proxy is further configured:

to receive a command response from the end device; and to send the command response to the first configuration device.

12. The system of claim 1, wherein the proxy is further configured to send an anticipated command response to the first configuration device.

13. The system of claim 12 wherein the proxy is configured to send the anticipated command response to the first configuration device before receiving a command response from the end device.

14. The system of claim 1, wherein the proxy is further configured to send a password to the end device.

15. The system of claim 14, wherein the proxy is further configured:

to receive a first partial password from the first configuration device;

to receive a second partial password from the second configuration device;

to fail to receive a third partial password from a third configuration device; and to construct the password from the first partial password and the second partial password.

16. The system of claim 15, wherein the second partial password comprises parity data.

17. The system of claim 1, wherein the proxy comprises a read-only proxy application.

18. A method, comprising:

receiving, by a network device, a first configuration command, for an end device, from a first configuration device;

receiving, by the network device, a second configuration command, for the end device, from a second configuration device;

determining that the first configuration command matches the second configuration command; and in response to determining that the first configuration command matches the second configuration command, sending the first configuration command to the end device.

19. The method of claim 18, further comprising sending an anticipated command response to the first configuration device.

20. A method, comprising:

receiving, by a network device, a first configuration command, for an end device, from a first configuration device;

receiving, by the network device, a second configuration command, for the end device, from a second configuration device;

receiving, by the network device, a third configuration command, for the end device, from a third configuration device;

determining that the first configuration command matches the second configuration command;

determining that the third configuration command does not match the first configuration command;

receiving, by the network device, a first partial password from the first configuration device;

receiving, by the network device, a second partial password from the second configuration device;

failing to receive, by the network device, a third partial password from the third configuration device;

constructing a password from the first partial password and the second partial password; and in response to determining that the first configuration command matches the second configuration command, sending the password, and a configuration command, to the end device.

* * * * *